United States Patent [19]

Bessios

[11] Patent Number: 5,862,157
[45] Date of Patent: Jan. 19, 1999

[54] METHOD AND CIRCUITRY FOR MONITORING A DIGITAL CHANNEL

[75] Inventor: Anthony G. Bessios, Dallas, Tex.

[73] Assignee: Texas Instruments Incorporated, Dallas, Tex.

[21] Appl. No.: 804,867

[22] Filed: Feb. 2, 1997

[51] Int. Cl.$^6$ ..................................................... G06F 11/00
[52] U.S. Cl. .............................................. 371/48; 360/65
[58] Field of Search ................................ 371/48, 47.1, 6; 360/65; 375/354, 355, 364, 367, 373, 376; 324/210, 211, 212

[56] References Cited

U.S. PATENT DOCUMENTS

| 5,297,184 | 3/1994 | Behrens et al. | 375/345 |
| 5,420,726 | 5/1995 | Mathews et al. | 324/212 |
| 5,585,975 | 12/1996 | Bliss | 375/355 |
| 5,592,340 | 1/1997 | Minuhin et al. | 360/65 |
| 5,726,818 | 3/1998 | Reed et al. | 360/51 |

OTHER PUBLICATIONS

Article, Roy D. Cideciyan, Francois Dolivo, Reto Hermann, Walter Hirt and Wolfgang Schott, "A PRML System for Digital Magnetic Recording," IEEE Journal on Selected Areas in Communications, vol. 10, No. 1, Jan. 1992, pp. 38–56.

Article, Hisashi Kobayashi and Donald T. Tang, "On Decoding of Correlative Level Coding Systems with Ambiguity Zone Detection," IEEE Transactions on Communication Technology, vol. COM–19, No. 4, Aug. 1971, pp. 467–477.

Article, James W. Smith, "Error Control in Duobinary Data Systems by Means of Null Zone Detection," IEEE Transactions on Communication Technology, vol. Com–16, No. 6, Dec. 1968, pp. 825–830.

Article, Robert Lugannani, "Intersymbol Interference and Probability of Error in Digital Systems," IEEE Transactions on Information Theory, vol. IT–15, No. 6, Nov. 1969, pp. 682–688.

Article, Frederick E. Glave, "An Upper Bound on the Probability of Error Due to Intersymbol Interference for Correlated Digital Signals," IEEE Transactions on Information Theory, vol. IT–18, No. 3, May 1972, pp. 356–363.

*Primary Examiner*—Trinh L. Tu
*Attorney, Agent, or Firm*—Bret J. Petersen; Richard L. Donaldson

[57] ABSTRACT

A method for monitoring a digital channel is provided that includes several steps such as receiving an analog input signal corresponding to a digital signal, and equalizing the analog input signal to generate an equalized signal to a predetermined partial response target. The method further includes generating a pseudoternary signal from the equalized signal, and analyzing the pseudoternary signal to detect polarity alternation violations, as well as RLL global and interleave constraint violations.

26 Claims, 4 Drawing Sheets

| SAMPLE: | #1 | #2 | #3 | #4 | #5 | #6 | #7 | #8 | #9 | #10 | #11 | #12 | #13 | #14 | #15 | #16 | #17 | #18 | #19 | #20 | #21 | #22 |
|---|---|---|---|---|---|---|---|---|---|---|---|---|---|---|---|---|---|---|---|---|---|---|
| 52 NON-INTERLEAVED OUTPUT OF SBS DETECTOR: | 0 | 1 | 0 | 0 | 0 | 1 | 0 | 1 | 0 | 1 | -1 | 0 | 0 | 0 | -1 | 1 | -1 | 1 | 0 | 1 | 1 | 1 |
| 54 ODD INTERLEAVE OUTPUT OF SBS DETECTOR: | 0 | — | 0 | — | 0 | — | 0 | — | 0 | — | -1 | — | 0 | — | -1 | — | -1 | — | 0 | — | 1 | — |
| 56 EVEN INTERLEAVE OUTPUT OF SBS DETECTOR: | — | 1 | — | 0 | — | 1 | — | 1 | — | 1 | — | 0 | — | 0 | — | 1 | — | 1 | — | 1 | — | 1 |
| 58 SCHEME A { VIOLATION DETECTOR: | — | — | — | — | — | — | — | — | X | X | — | — | — | — | X | X | X | X | — | — | — | X |
|            { AND ACCUMULATOR: | 0 | 0 | 0 | 0 | 0 | 1 | 1 | 1 | 2 | 3 | 3 | 3 | 3 | 3 | 4 | 4 | 4 | 5 | 5 | 5 | 5 | 6 |
| 60 SCHEME B { VIOLATION DETECTOR: | — | — | — | — | — | X | — | X | X | X | — | — | — | — | X | X | X | X | — | X | — | X |
|            { AND ACCUMULATOR: | 0 | 0 | 0 | 0 | 0 | 1 | 1 | 2 | 3 | 4 | 4 | 4 | 4 | 4 | 5 | 6 | 7 | 8 | 8 | 9 | 9 | 10 |

| SAMPLE: | #1 | #2 | #3 | #4 | #5 | #6 | #7 | #8 | #9 | #10 | #11 | #12 | #13 | #14 |
|---|---|---|---|---|---|---|---|---|---|---|---|---|---|---|
| DESIRED NON-INTERLEAVED TERNARY DATA AT OUTPUT OF EQUALIZER: | +1 | 0 | −1 | 0 | 0 | −1 | +1 | 0 | −1 | +1 | 0 | 0 | 0 | −1 ⁓82 |
| POTENTIAL OUTPUTS OF SBS DETECTOR: | +1 | 0 | −1 | 0 | 0 | −1 | +1 | 0 | −1 | 0 | 0 | 0 | 0 | −1 ⁓84 |
| | +1 | 0 | −1 | 0 | 0 | −1 | +1 | 0 | −1 | +1 | 0 | +1 | 0 | −1 ⁓86 |
| | +1 | 0 | −1 | 0 | 0 | −1 | +1 | 0 | −1 | −1 | 0 | 0 | 0 | −1 ⁓88 |
| | +1 | 0 | −1 | −1 | 0 | 0 | +1 | 0 | −1 | +1 | 0 | 0 | 0 | −1 ⁓90 |
| | +1 | 0 | −1 | 0 | 0 | −1 | +1 | 0 | −1 | 0 | 0 | 0 | 0 | 0 ⁓92 | ns
METHOD AND CIRCUITRY FOR MONITORING A DIGITAL CHANNEL

TECHNICAL FIELD OF THE INVENTION

This invention relates generally to the field of digital communications and more particularly to a method and circuitry for monitoring a digital channel.

BACKGROUND OF THE INVENTION

Digital channels may be found in various communication and electronic technologies such as telecommunications systems, wireless communication systems, and in the magnetic recording technologies such as the read channel circuitry of some of the more recent and advanced hard disk drives. It is often necessary and desirable to monitor the performance of a digital channel by detecting data errors. The performance of a digital channel may be measured by calculating or estimating a bit-error-rate (BER) or a signal-to-noise ratio (SNR), both of which are related. The monitoring of digital channel performance is necessary and desirable for numerous reasons. For example, the detection of the presence of excessive data errors in the digital channel may be indicative of high levels of undesirable noise, less than optimal circuitry performance, or other problems which, if uncorrected, may harm the overall performance of the associated system or device. By eliminating or reducing any undesirable noise, overall system performance may be improved. Similarly, if the excessive data errors are caused by less than optimal circuitry performance, associated circuitry parameters may be adjusted to improve overall system operation. In some cases, the presence and accumulation of data errors in the digital channel at specified levels or rates may signify an impending system failure.

The capability to accurately and timely monitor digital channel performance by detecting data errors may provide advanced warning of an impending system failure so that appropriate action may be taken to avoid a complete system failure or to minimize the effects of a complete system failure. For example, the presence of data errors at a specified level or rate in the digital channel or read channel of a hard disk drive may indicate an impending disk/head crash. As such, corrective action may be taken to avoid the complete loss of hard disk drive data. The hard disk drive may be backed up and adjustments may be made to prevent a subsequent system failure. Similarly, the SNR may be statistically correlated to overall system failure. For example, the gradual degradation of a hard disk drive media and disk/heads will result in a decrease in the overall SNR of the hard disk drive data channel. The level and amount of change may be statistically correlated to predict an ensuing hard disk drive failure. By predicting this failure in advance, steps can be taken to save the data or to take other steps to prevent the ensuing failure.

Unfortunately, prior techniques used to monitor the performance of a digital channel, such as the read channel of a hard disk drive using advanced signal processing techniques and class IV, partial response (PR4) coding, are complicated and often require complicated circuitry and algorithms. This is especially true in bandwidth confined applications where partial response signaling techniques are used in a highly efficient manner to utilize the limited bandwidth. Prior techniques also often require that a known data pattern be sent through the digital channel and then analyzed for errors. For example, if the read channel of a hard disk drive is the digital channel being monitored, a known data pattern, such as a training field or training data, is first written to the platters of the hard disk drive and then read. The data is monitored as it is being read and compared to the training data to detect errors. Often, a complex algorithm is also provided to analyze the results and to determine the performance of the digital channel or read channel. This is a time consuming and complex solution that requires a significant number of steps and cannot be performed real-time using actual user data because the actual user data is not known and cannot be compared. Furthermore, if the training field is permanently stored on the platters of the hard disk drive for periodic monitoring, the technique suffers the added disadvantage of a reduction in overall storage capacity because of the storage capacity that must be dedicated to the training field. In wireless communication applications, the use of training data increases overall operational costs and reduces overall capacity due the resource allocation involved in transmitting and receiving the training data in place of user data.

Other prior techniques used to monitor the performance of a digital channel, such as the read channel of a hard disk drive, do not require the training field but, instead, require additional circuitry for comparing a data sample with an estimated ideal value. The difference between the data sample and the ideal value is determined and used in a complex algorithm such as the mean-squared-error (MSE) algorithm or the least-mean-square (LMS) algorithm. As such, these techniques require complex circuitry and complex algorithms to perform the necessary operations to monitor the performance of a digital channel. The added circuitry also contributes to overall circuitry die area and increased power consumption.

SUMMARY OF THE INVENTION

From the foregoing it may be appreciated that a need has arisen for a method and circuitry for monitoring a digital channel that eliminate or reduce the problems of prior techniques. In accordance with the present invention, a method and circuitry for monitoring a digital channel are provided which substantially eliminate the disadvantages and problems outlined previously. The present invention uses a new criteria for monitoring a digital channel to calculate or estimate a channel bit error rate (BER). The new criteria includes monitoring a ternary or pseudoternary signal and checking for polarity alternation (PA) violations and may also include checking for global constraint violations such as run-length limited (RLL) global constraint violations.

According to the present invention, a method for monitoring a digital channel is provided that includes several steps such as receiving an analog input signal that corresponds to a digital signal, and equalizing the analog input signal to generate an equalized signal to a predetermined partial response target. The method further includes generating a pseudoternary signal from the equalized signal, and analyzing the pseudoternary signal to detect polarity alternation violations. The polarity alternation violations correspond to data errors in the digital channel which are related to the BER of the digital channel.

The present invention provides a myriad of technical advantages. A technical advantage of the present invention includes the capability to easily and accurately monitor the performance of a digital channel in real time and to predict the SNR and the BER of the digital channel, such as the read channel of a hard disk drive. Another technical advantage of the present invention includes the capability to perform on-the-fly monitoring of actual user data without the use of any training fields or training data that are required by prior techniques. This capability increases overall storage capacity due to the elimination of any training fields or training data. Yet another technical advantage of the present invention includes the capability to monitor the performance of a digital channel using minimal circuitry resulting in reduced silicon area or integrated circuit area, reduced overall power consumption, and increased circuitry reliability.

Still further technical advantages of the present invention include the capability to monitor the performance of a digital channel without using complex algorithms such as the MSE or the LMS algorithms. Yet another technical advantage of the present invention includes the capability to monitor the performance of a digital channel to predict system failure. For example, the read channel of a hard disk drive may be monitored using the present invention to anticipate and predict future system failure by estimating and monitoring such system parameters as SNR and BER. This allows corrective action to be taken to prevent the catastrophic loss of hard disk drive information. Yet another technical advantage of the present invention includes the capability to use the present invention during the initial tuning of the electronic circuitry of a read channel of a hard disk drive to assist with optimizing various circuitry parameters such as digital filter coefficients, finite impulse response filter coefficients, timing recovery parameters, and analog filter parameters. These various circuitry parameters may be programmable. The present invention may also be used to optimize the various circuitry of the hard disk drive at later times as optimal circuitry settings change. The optimal circuitry settings may change throughout the life of a hard disk drive due to such factors as mechanical wear and drive wear. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
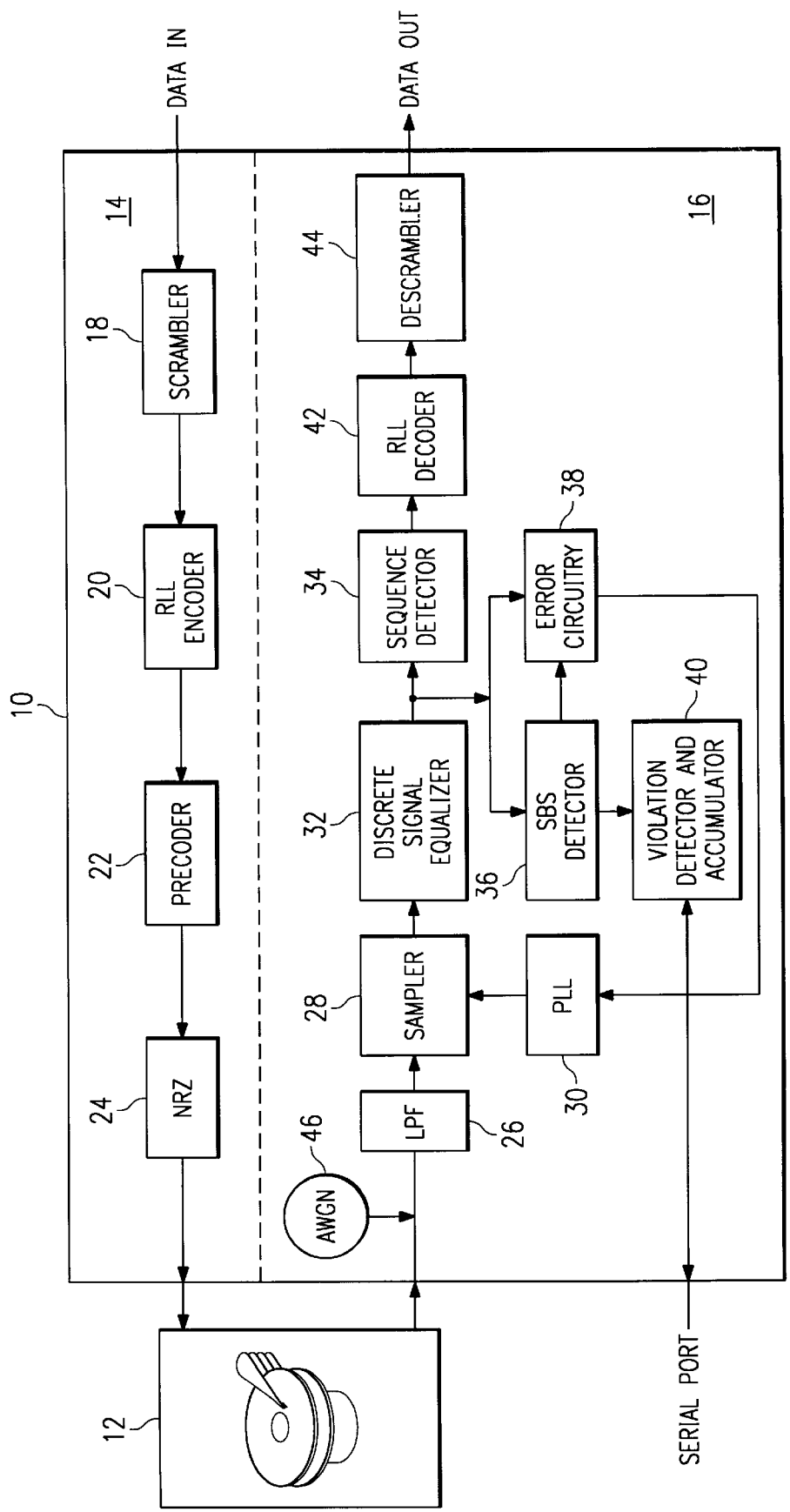
FIG. 1 is a block diagram illustrating an exemplary data channel of a hard disk drive that includes a write channel and a read channel.

FIG. 1 is a block diagram illustrating an exemplary data channel 10 of a hard disk drive that includes a write channel 14 and a read channel 16. The data channel 10 is shown coupled to a disk/head assembly 12 so that data may be exchanged between data channel 10 and disk/head assembly 12. Write channel 14 is used during write operations to receive an input digital signal and to process and code the input digital signal using RLL coding, precoding, and NRZ modulation to generate an analog output signal, such as an analog write current, so that the signal information may be stored magnetically on the platters of disk/head assembly 12. Read channel 16 is used during read operations to retrieve and decode information stored on disk/head assembly 12. Read channel 16 equalizes an analog input signal according to a desired transfer function so that information may be more reliably read in the presence of intersymbol interference. For example, read channel 16 may equalize the analog input signal according to the transfer function $1-D^2$ to provide PR4 spectral shaping. The partial response coding is introduced to shape the channel spectrum to a desired target and allow for controlled intersymbol interference which will be resolved by a sequence detector, as discussed more fully below. The partial response coding and controlled intersymbol interference increases the overall data storage density.

Write channel 14 includes a scrambler 18, an RLL encoder 20, a precoder 22, and a nonreturn-to-zero (NRZ) modulator 24. During a write operation, write channel 14 receives an input digital signal at the input of scrambler 18 and processes the signal to generate an analog write current output signal at the output of NRZ modulator 24. The analog output signal is received by disk/head assembly 12 and stored as magnetic flux transitions on the platters of disk/head assembly 12.

Scrambler 18 receives the input digital signal and scrambles the signal according to a known polynomial, to generate a scrambled digital signal as an output. Scrambler 18 adds randomness to the data and may be implemented using digital circuitry, such as a shift register, to provide various delays. In one such implementation, digital circuitry is provided so that an eight-bit word may be mapped into another eight-bit word. For example, the scrambler may scramble the input digital signal according to the polynomial $1+x^5+x^9$.

The scrambled digital signal is then provided from scrambler 18 to RLL encoder 20 to generate an encoded digital signal as an output. RLL encoder 20 enforces a block encoding scheme, such as a run-length limited block encoding scheme. The RLL block encoding scheme will generally be provided as a (d,k) constraint in which the d parameter reflects the minimum number of zeros between ones, while the k parameter reflects the global constraint and signifies the maximum number of consecutive zeros that may be provided between ones. For example, the RLL constraint may be provided as a (0,4) constraint and may be provided at a rate of 8/9 such that eight input bits are converted into nine output bits while meeting the RLL constraint. The RLL constraint may also include the constraint that identifies the maximum number of consecutive zeros that may be provided between two ones in each interleave sequence or sub-sequence. This is normally provided in partial response (PR) read channels that are constrained by the $1-D^n$ transfer function such as the $1-D^2$ transfer function. This parameter may be referred to as an interleave constraint and may be provided in the following format (0,4/4). The RLL encoding increases overall system reliability and recording density by ensuring that a sufficient number of transitions will be generated at the equalized output of read channel 16 to guarantee a more reliable timing recovery. This will be discussed more fully below.

Precoder 22 receives the encoded digital signal from RLL encoder 20 and codes the signal to meet a desired transfer function. For example, assuming that data channel 10 is implemented as a PR channel, precoder 22 may be provided as an infinite impulse response (IIR) filter that codes the encoded digital signal according to the following equation:

$$\frac{1}{1 \oplus D^2}$$

Precoder 22 generates a precoded digital signal that is then provided to NRZ modulator 24.

NRZ modulator 24 receives the precoded digital signal and generates an analog output signal in response. The analog output signal is used to drive the read/write heads of disk/head assembly 12 so that data may be stored on the platters of disk/head assembly 12. NRZ modulator 24 provides the analog output signal to the read/write heads so that current is provided in the read/write heads in either one direction or the opposite direction. The direction of the current corresponds to the direction of the magnetic transitions that will be stored on the platters of disk/head assembly 12. NRZ modulator 24 may be implemented using any of a variety of known circuitry that is well known in the art. For example, the modulator may generate the analog write current output signal to conform to an NRZ format or an NRZI format. After information has been magnetically stored on the platters of disk/head assembly 12, the data may then be read during a read operation using the various circuitry of read channel 16.

Read channel 16 includes a low pass filter 26, a sampler 28, a phase locked loop (PLL) 30, a discrete-time signal equalizer 32, a sequence detector 34, a symbol-by-symbol (SBS) detector 36, an error circuitry 38, a violation detector 40 and accumulator 40, an RLL decoder 42, a descrambler 44, and an additive white gaussian noise (AWGN) source 46. Read channel 16 uses the various circuitry modules to receive an analog input signal from disk/head assembly 12 and to generate a corresponding digital data signal at the output of sequence detector 34. For example, read channel 16 may perform PR4 coding which, in effect, provides the following mapping from a binary signal to a three-level or ternary signal:

$$..0, 0, 0, 1, 0, 1, 1, 0, 1, 1, 1...1 \xrightarrow{-D^2} ...0, -1, 0, 0, -1, 1, 0, -1, 0..$$

As such, the present invention takes advantage of the fact that, when analyzing every other sample of the ternary signal, it is only allowable to have a polarity alternation between every other non-zero sample. When analyzing actual data, if the polarity does not alternate between to such non-zero samples, then an error has occurred and the BER is increased. This is discussed more fully below and illustrated more fully in FIG. 2. After read channel 16 generates the digital data signal at the output of sequence detector 34, the signal is then decoded using RLL decoder 42 to remove the RLL block encoding that was provided by RLL encoder 20 when the data was originally written to disk/head assembly 12. The decoded digital data signal is then provided to descrambler 44 where the signal is descrambled to reverse the effects of scrambler 18 so that the correct digital data output signal may be provided as an output of read channel 16.

When information is first retrieved from disk/head assembly 12, an analog input signal is received at low pass filter 26 where the signal is filtered to generate a filtered analog signal. The analog input signal is provided at both positive and negative values depending upon the direction and strength of the corresponding magnetic flux that is provided on the platters of read/head assembly 12. Low pass filter 26 may be implemented as a continuous-time 7th order filter with an adjustable and programmable boost, cut-off frequency, and asymmetrical zeros. Low pass filter 26 may be implemented using Gm/C stages. AWGN source 46 is also shown providing an AWGN signal into low pass filter 26. The AWGN signal may be caused by noise generated by the electronic circuitry of data channel 10. In another embodiment, AWGN source 46 may be a controllable noise source that is used with the present invention to optimize various circuitry parameters, such as the boost, bandwidth, or cut-off frequency, and asymmetrical zero parameters of low pass filter 26. In such an arrangement, the BER of read channel 16 may be monitored while the AWGN signal is provided at various levels. Various circuitry parameter settings of read channel 16 may be adjusted at the various AWGN signal levels to minimize or reduce the BER. These circuitry parameter settings may be saved and used during actual operation when the BER reaches a specified level.

The gain of the analog input signal, as it is provided to low pass filter 26, may be controlled using an automatic gain control circuit and a variable gain amplifier to ensure that the amplitude of the analog input signal is at a desired value. However, this is not expressly shown in FIG. 1 but may be implemented in other embodiments of read channel 16.

Sampler 28 receives the filtered analog signal from low pass filter 26 and samples the signal to generate a discrete analog signal having discrete in time and continuous in amplitude values as an output signal. Sampler 28 is controlled through a sampling clock generated by a PLL 30 as shown. Sampler 28 samples the value of the filtered analog signal each time the sampling clock is provided in an enabled state by PLL 30. As a consequence, the discrete analog signal is generated. Ideally, the filtered analog signal is sampled synchronously at times that correspond to the various magnetic transitions stored on disk/head assembly 12. These magnetic transitions correspond to the stored data. Sampler 28 may be implemented using a variety of sample and hold circuits such as a circular sample and hold circuit that is time sequence multiplexed to discrete-time signal equalizer 32 so that the correct time sequenced value is presented to discrete-time signal equalizer 32.

Discrete-time signal equalizer 32 receives the discrete analog signal from sampler 28 and filters or equalizes the signal to generate an equalized signal that is equalized to the target function expected by sequence detector 34. The equalized signal includes discrete values that are provided at both positive and negative values. Due to the functions of RLL encoder 20 and precoder 22 of write channel 14, the discrete values of the equalized signal maintain the zero and non-zero bit values imposed by the RLL constraint. For example, each discrete value of the equalized signal will correspond to an RLL constrained bit and will be provided at around a value of zero when the corresponding RLL constrained bit is provided as a zero bit, and at some non-zero value when the corresponding RLL constrained bit is provided as a one bit. The presence of the RLL global constraint in the equalized signal assists with timing recovery, and the presence of the RLL interleave constraint in the equalized signal assists with with sequence detection by controlling the required trellis length. Discrete-time signal equalizer 32 may be implemented as an analog finite impulse response (FIR) filter. Alternatively, an analog-to-digital converter may be provided in place of sampler 28 between low pass filter 26 and discrete-time signal equalizer 32 to convert the filtered analog signal to a corresponding filtered digital signal. In such a case, the analog-to-digital converter will be controlled by PLL 30 and the filtered digital signal may be provided to discrete-time signal equalizer 32, which may be implemented as a digital FIR, where the filtered digital signal will be filtered to generate the equalized signal. Assuming that discrete-time signal equalizer 32 is implemented as an analog FIR, discrete-time signal equalizer 32 receives a plurality of filter coefficients or taps that are used at each one of a plurality of multipliers to equalize or filter the discrete analog signal. Each one of the plurality of multipliers also receives a consecutive discrete value from the discrete analog signal. The outputs of each of the multipliers are then provided as inputs to an adder, such as an analog summer, which sums the inputs to generate the equalized signal that serves as the output of discrete-time signal equalizer 32. As the discrete time analog signal changes, the consecutive discrete values of the discrete analog signal also change such that a new discrete value is now provided to the first multiplier of the plurality of multipliers and the oldest discrete value is dropped from the last multiplier. The remaining discrete time values are shifted to the next one of the plurality of multipliers. The continuous amplitude equalized signal is provided, ideally, at discrete values at or near the following three levels: −1, 0, +1.

The equalized signal is then provided to sequence detector 34, SBS detector 36, and error circuitry 38. Focusing now on SBS detector 36, the equalized signal is provided as an input so that a corresponding pseudoternary signal is generated as an output. The pseudoternary signal receives its name from the fact that it provides three signal levels to transmit one bit of information. Thus, a two-element set is mapped into a three-element set. SBS detector 36 analyzes each discrete value of the equalized signal, which is discrete in time and continuous in amplitude, and generates a corresponding value that indicates whether the discrete equalized value is provided at a +1, −1, or 0 level.

SES detector 36 may also be referred to as a slicer and may be implemented using comparators such that each discrete value of the equalized signal is compared to a known threshold value that indicates the relative amplitude of the discrete value to assign a target value. For example, SBS detector 36 may include two comparators that are each used to compare a discrete value of the equalized signal to a threshold value that is provided between targets 0 and 1, and between targets 0 and −1. If the discrete value is greater than the threshold value between 0 and 1, the discrete value may be estimated as a +1. On the other hand, if the discrete value is found to be less than the threshold value between 0 and −1, the discrete value may be estimated to be a −1, otherwise the discrete value is estimated to be a 0. This will be illustrated more fully in FIGS. 3 and 4. More sophisticated implementations of SBS detector 36 are possible that take into account such things as ambiguity-zones and use ambiguity-zone compensation algorithms. Ambiguity zones occur at a region around a threshold value and are discussed more fully in H. Kobayashi and D. T. Tang, "On Decoding of Correlative Level Coding Systems with Ambiguity Zone Detection," *IEEE Trans. on Comm. Technology*, Vol. COM-19, No. 4, pp. 467–477, Aug. 1971. The pseudoternary signal generated by SBS detector 36 may be provided as an analog signal or as a digital signal that indicates the estimated value of each discrete sample.

Assuming that the pseudoternary signal is provided as a digital signal, the pseudoternary signal may be provided as a two-bit digital signal to violation detector and accumulator 40 and error circuitry 38. Violation detector and accumulator 40 receives the pseudoternary signal and analyzes the signal to determine whether a polarity alternation violation has occurred. As will be illustrated more fully below and in FIG. 2, a polarity alternation violation for a PR4 read channel, that is modeled in the form of the transfer function $1-D^2$, may be detected by analyzing every other data sample to construct an odd interleave pseudoternary signal and an even interleave pseudoternary signal. The odd interleave pseudoternary signal and the even interleave pseudoternary signal may be referred to as sub-sequences. Each of the interleave signals are then examined to ensure that polarity alternations occur between every other non-zero value. Each of the interleave signals are analyzed and the violations are stored in a counter, register, or accumulator for further analysis. A serial port may also be provided, as illustrated in FIG. 1, to provide access to the accumulated polarity alternation violations so that appropriate actions may be taken.

Violation detector and accumulator 40 also analyzes the pseudoternary signal to determine compliance with the RLL global constraint. For example, if the global constraint is set to four, the presence of five consecutive zeros constitutes a global constraint violation. These violations may be stored separately or together with the polarity alternation violations. Violation detector and accumulator 40 may be implemented using any of a variety of circuitry, such as digital circuitry and comparators, to perform the required comparisons and accumulations. Each polarity alternation violation and global constraint violation signifies a data error and thus increases the BER. The fast accumulation of either polarity alternation violations or global constraint violations may signify an impending head crash in a hard disk drive. Also, the gradual degradation in BER due to such things as head flying height variations may signify an impending head crash. The monitoring of polarity alternation violations and global constraint violations may also be used to establish and adjust various circuitry parameters of read channel 16, such as the boost and cut-off frequency of low pass filter 26 and the tap coefficients of the multipliers of discrete-time signal equalizer 32, to minimize the BER. The bandwidth of PLL 30 may also be optimized using the present invention.

In determining polarity alternation violations, various counting schemes may be implemented to determine the number of polarity alternations. Two such schemes are illustrated more fully below in connection with the description accompanying FIG. 2. It should be noted that in one embodiment of the present invention, the only additional circuitry required to monitor the performance of read channel 16 is the addition of violation detector and accumulator 40. This provides a substantial benefit over prior digital channel monitoring techniques that require complex circuitry and algorithms.

The equalized signal and the pseudoternary signal are both provided to error circuitry 38 where it is used to determine the magnitude of the disparity or error between each discrete sample of the equalized signal and its desired value. Error circuitry 38 generates an error signal in response that reflects this disparity. The error signal is then provided to PLL 30 and is used to ensure the accurate generation of the sampling clock which is used by sampler 28 to sample the filtered analog signal. Error circuitry 38 may be implemented using a multiplexer in which the pseudoternary signal is used to select from a positive target value, a zero target value, and a negative target value which will then be provided to an analog summer where the selected target value may be subtracted from the actual discrete value of the equalized signal to generate the error signal.

PLL 30 may be implemented using any of a variety of known circuitry to generate a sampling clock but will generally include a voltage controlled oscillator and phase detector to ensure the accurate generation of the sampling clock. PLL 30 will generally receive a crystal clock or timing signal as an input, which is not shown in FIG. 1, to assist in establishing the sampling clock.

Sequence detector 34 also receives the equalized signal from discrete-time signal equalizer 32 and generates a digital data signal as an output. In one embodiment, sequence detector 34 may be a maximum likelihood detector or Viterbi detector implementing the Viterbi algorithm. Assuming that sequence detector 34 is implemented as a Viterbi decoder, sequence detector 34 includes a metric circuit and a trellis circuit for analyzing the discrete values of the equalized signal. The metric circuit receives the equalized signal from discrete-time signal equalizer 32 and performs an add, compare, and select function to determine whether a magnetic transition may or may not have occurred on the platters of the disk. The output of the metric circuit is provided to the trellis circuit which acts as a decision tree for sequence decoding. The trellis design is based on the partial response target chosen for the equalized output to resolve the introduced controlled intersymbol interference and to recover the original RLL encoded data. The trellis circuit generates the digital data signal which serves as the output of sequence detector 34 and is provided to RLL decoder 42. The accuracy of sequence detector 34 is generally about 3 dB greater than the performance of SBS detector 36.

As mentioned previously, RLL decoder 42 removes the RLL constraints that were provided by RLL encoder 20. RLL decoder 42 generates a decoded data signal which is provided to descrambler 44. Descrambler 44, as was also previously mentioned, descrambles the decoded data signal to generate the digital data output signal. Descrambler 44 descrambles the decoded data signal in a manner to remove the effect of the scrambling previously provided by scrambler 18 during a write operation.

Figures 2, 3:
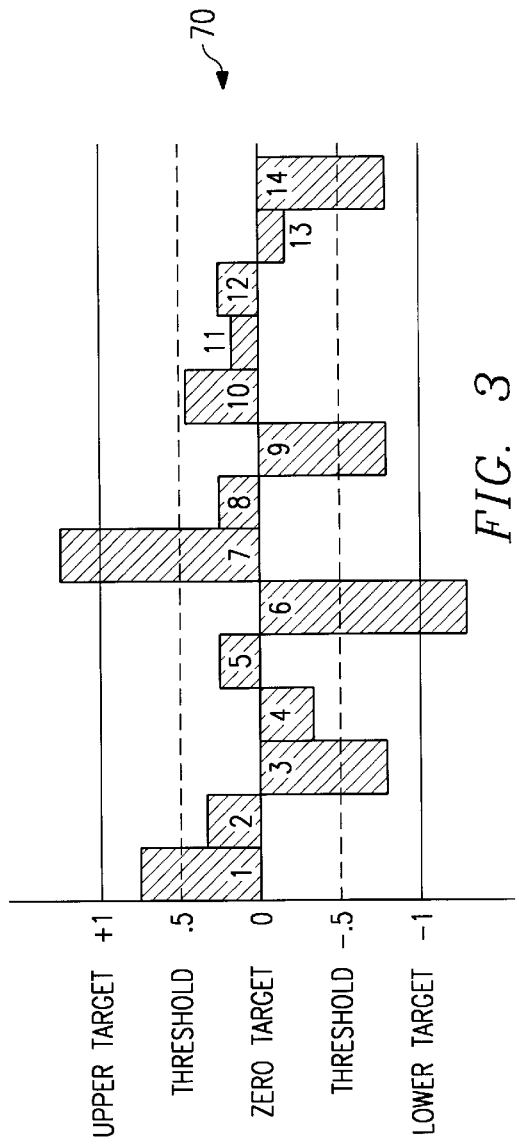
FIG. 2 is a data table illustrating the operation of a violation detector and accumulator of the read channel using a Scheme A and a Scheme B for detecting polarity alternation violations according to the teachings of the present invention.
FIG. 3 is a bar graph illustrating the operation of a symbol-by-symbol detector of the read channel.

FIG. 2 is a data table 50 illustrating the operation of violation detector and accumulator 40 of read channel 16 using a Scheme A and a Scheme B for determining polarity alternations. Twenty-two data samples of the pseudoternary signal, which is provided at the output of SBS detector 36, are provided in a data sequence 52. As indicated in FIG. 2, data sequence 52 may be thought of as a non-interleaved output of SBS detector 36. Data sequence 52 may be split into two data sequences which are indicated as an odd data sequence 54 and an even data sequence 56. As shown, odd data sequence 54 includes the sample value of each odd numbered sample provided by data sequence 52. Similarly, even data sequence 56 includes the sample value of each even numbered sample provided by data sequence 52.

The detection of violations by violation detector and accumulator 40 may include polarity alternation violations, interleave constraint violations, and global constraint violations. A data sequence 58 and a data sequence 60 are provided to illustrate two different schemes for detecting polarity alternations. Data sequence 58 illustrates the determination of polarity alternation violations and global constraint violations by violation detector and accumulator 40 according to Scheme A. The first row of data sequence 58 indicates the presence of any type of violation with an X. The second row of data sequence 58 provides an accumulator which tabulates the total number of violations. It should be noted that the global constraint violations and interleave constraint violations are normally determined by the same method in both Scheme A and Scheme B.

Scheme A involves analyzing, for both odd data sequence 54 and even data sequence 56, every other non-zero sample to check for a polarity alternation violation. The lack of a polarity alternation between every other non-zero sample indicates an invalid state and hence a data error. Once a pair of non-zero sample values have been compared and a polarity violation has been found, Scheme A resets or assumes that these values are zero when analyzing subsequent non-zero samples. For example, referring now to odd data sequence 54, and proceeding from sample #1 to sample #11, a –1 is found as the first non-zero sample. The next –1 is found at sample #15. As such, because the polarity did not alternate, a polarity alternation violation is found according to Scheme A. This polarity alternation violation is indicated by an X on the first row of data sequence 58 at sample #15. Proceeding next to sample #17, a polarity alternation violation is not found because, as was mentioned earlier, Scheme A assumes that sample #11 and sample #15 of odd data sequence 54 are 0's. As such, the –1 at sample #17 is the first non-zero sample found and the next non-zero sample is provided as a 1 at sample #21. Thus, no additional polarity alternation violations are found.

Odd data sequence 54 also illustrates an example of an interleave constraint violation. Assuming that the interleave constraint parameter is provided at a value of four, there should not be more than four successive zeros in a row. As illustrated by odd data sequence 54, five zeros are provided in a row from sample #1 to sample #9. As such, an error is indicated at sample #9 at data sequence 58. Once again, the determination of global constraint violations and interleave constraint violations normally do not differ between Scheme A and Scheme B. Data sequence 52 does not provide an example of a global constraint violation. A global constraint violation would occur, for example, when five successive 0's are provided in data sequence 52 when the global constraint parameter is set to four.

Data sequence 60 illustrates the determination of polarity alternation violations, interleave constraint violations and global constraint violations according to Scheme B. The first row of data sequence 60 indicates the presence of any type of violation with an X. The second row of data sequence 60 provides an accumulator, just like data sequence 58, to tabulate the total number of violations. With respect to polarity alternation violations, Scheme B involves analyzing, for both odd data sequence 54 and even data sequence 56, every other non-zero sample to check for a polarity alternation violation. Just as with Scheme A, the lack of a polarity alternation between every other non-zero sample indicates an invalid state and hence a data error. Unlike Scheme A, once a pair of non-zero sample values have been compared and a polarity violation has been found, Scheme B does not reset these values to zero. Hence, three successive non-zero sample values of the same polarity result in at least two polarity alternation violations.

Referring now to odd data sequence 54, an interleave constraint violation is found at sample #9 which is indicated with an X on the first row of data sequence 60. Proceeding further down data sequence 54, the first polarity alternation violation is found at sample #15 which is marked in data sequence 60. Next, another polarity alternation violation is found at sample #17 where the polarity remains the same as was found in sample #15. This is marked with an X at sample #17 in the first row of data sequence 60 and illustrates an example of a difference between the calculation of polarity alternation violations between Scheme A and Scheme B. Proceeding next to data sequence 56, a polarity alternation violation is found at sample #6, sample #8, sample #10, sample #16, sample #18, sample #20, and sample #22. The presence of polarity alternation violations in data sequence 60 at sample #8, sample #16, and sample #20 reflect the differences in determining polarity alternation violations between Scheme A and Scheme B.

FIG. 3 is a bar graph 70 illustrating the operation of SBS detector 36 of read channel 16 in generating the pseudoternary signal. Fourteen discrete values of the equalized signal generated by discrete-time signal equalizer 32 are illustrated. SBS detector 36 compares the amplitude of each discrete value to an upper threshold value, which is set to 0.5, and a lower threshold value, which is set to −0.5. The units of the threshold value may, for example, be expressed in volts.

Discrete value #1 is shown to be greater than the upper threshold and thus will be detected by SBS detector 36 to be a +1 when generated as part of the pseudoternary signal. Similarly, discrete value #7 will also be detected by SBS detector 36 to be a +1 since its amplitude is greater than the upper threshold. The following discrete values will be detected to be 0's since their amplitudes fall below the upper threshold and above the lower threshold: #2, #4, #5, #8, #10, #11, #12, and #13. The following discrete values will be detected by SBS detector 36 to be −1's since their amplitudes are found to be less than the lower threshold value: #3, #6, #9, and #14. In an alternative embodiment, an ambiguity-zone may be defined around both the upper threshold value and the lower threshold value. In such a case, ambiguity-zone compensation algorithms may be used to increase the accuracy of SBS detector 36 when the amplitude of discrete values of the equalized signal are provided at or near either the upper threshold value or the lower threshold value. For example, the amplitude of discrete value #10 is close to the upper threshold value and may in fact be a +1 value. Discrete value #10 may be provided within the ambiguity-zone and thus may be treated differently by an ambiguity-zone compensation algorithm.

It should also be mentioned that SBS detector 36 may sometimes misdetect data. The misdetected data may be classified into two types. The first type occurs when the amplitude of a discrete value of the equalized signal is provided at a value that is one zone from its true value. For example, discrete value #10, if its actual value should be +1, would constitute the first type of misdetection since it is one zone or one level from its true value. These types of misdetections by SBS detector 36 may occur during high SNR. The other type of misdetection by SBS detector 36 generally occurs during low SNR and is a misdetection that is two zones from the true value. For example, assuming that the actual value of discrete value #9 is actually a +1, SBS detector 36 will indicate that this is −1 value, normally due to the high level of noise. The two types of misdetections are discussed more fully below and are illustrated more fully in FIG. 4.

Figures 4, 5:
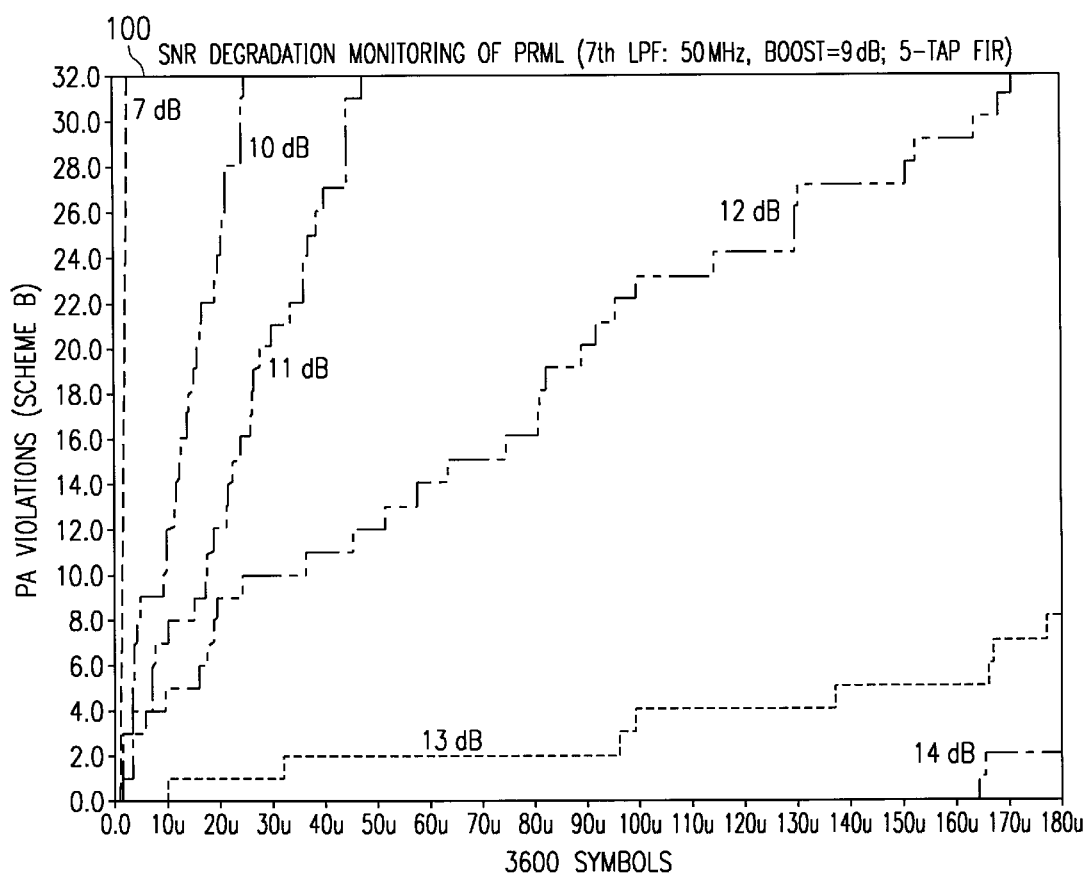
FIG. 4 is a data table illustrating various examples of potentially misdetected data by the symbol-by-symbol detector.
FIG. 5 is a graph illustrating the results of a simulation that shows polarity alternation violations as a function of the number of symbol detections for various signal-to-noise ratio levels.

FIG. 4 is a data table 80 illustrating various examples of potentially misdetected data by SBS detector 36. A data sequence 82 is provided which represents the true or actual discrete values that should be provided for fourteen samples of the equalized signal that is generated by discrete-time signal equalizer 32. FIG. 4 also illustrates five corresponding data sequences representing the non-interleaved outputs of the pseudoternary signal generated by SBS detector 36.

Referring now to a data sequence 84, it is noted that data sequence 84 illustrates one misdetection at sample #10. Instead of detecting a +1, the pseudoternary signal indicates a 0 instead. This is an example of a one level or one zone misdetection as was discussed above. These types of misdetections normally occur during high SNR. It has been found that utilizing Scheme A, as was discussed above and as illustrated in FIG. 2, in violation detector and accumulator 40 to determine the number of polarity alternation violations may prove more advantageous in such situations. Once again, Scheme A involves resetting the previously detected samples to a 0 value once a polarity alternation violation has been found. As a result of the misdetection at sample #10, a polarity alternation violation is detected between samples #6 and #14.

Referring now to a data sequence 86, it is noted that a misdetection has occurred at sample #12 where a +1 has been detected although the desired value is a 0. Just as with data sequence 84, this is an example of a one level or one zone misdetection and may be best handled using Scheme A in violation detector and accumulator 40. However, it should be noted that in the examples provided by data sequence 84 and data sequence 86, the polarity alternation violation counting schemes of both Scheme A and Scheme B would each indicate one violation. The polarity alternation violation would be generated because of the lack of polarity alternation between example #10 and #12.

Referring next to a data sequence 88, a two level or two zone misdetection is illustrated at sample #10 where a −1 is detected when a +1 is the desired discrete value of the equalized signal. As was mentioned previously, these types of misdetections normally occur during low SNR and may be best handled using the Scheme B method for determining polarity alternation violations in violation detector and accumulator 40. It should be noted that in the event that Scheme A were used, one error or polarity alternation violation would be detected because of sample #16 and #10, while if Scheme B were used, two errors or polarity alternation violations would be detected because of sample #6, #10, and #14. Because these types of misdetections normally occur at low SNR, the double counting provided by Scheme B may be more reflective of the actual BER and the corresponding SNR level.

A data sequence 90 is also provided in FIG. 4 and illustrates a situation where a double misdetection occurs which results in no polarity alternation violations being found. The two misdetections are one level or one zone type misdetections and result in a situation where no polarity alternation violations would be detected using either Scheme A or Scheme B. Finally, referring to a data sequence 92, an example of a global constraint violation is illustrated where the global constraint parameter is provided at four. Referring to samples #10 through #14, five 0's are provided in a row. This should be distinguished from the interleave constraint violations which were discussed previously and illustrated in FIG. 2.

FIG. 5 is a graph 100 illustrating the results of a simulation that shows polarity alternation violations as a function of the number of symbol detections at various SNR levels. In this simulation, low pass filter 26 was provided as a seventh order low pass filter with a cut-off frequency of 50 MHZ and a boost of 9 dB. Also, discrete-time signal equalizer 32 was implemented as an analog FIR having five tap coefficients. As is illustrated, the polarity alternations are greatest when the SNR is lowest. For example, when the SNR is provided at 7 dB, a polarity alternation violation is found for almost every symbol or discrete value that is analyzed. On the other hand, at an SNR level of 14 dB, the number of polarity alternation violations does not begin to accumulate until around 1600 samples or discrete values have been analyzed.

Graph 100 illustrates the relationship between SNR and polarity alternation violations. Although not specifically shown in FIG. 5, global constraint violations and interleave constraint violations may also be detected and accumulated. However, simulation results indicate that polarity alternation violations tend to dominate the number of global constraint violations and interleave constraint violations.

Figure 6:
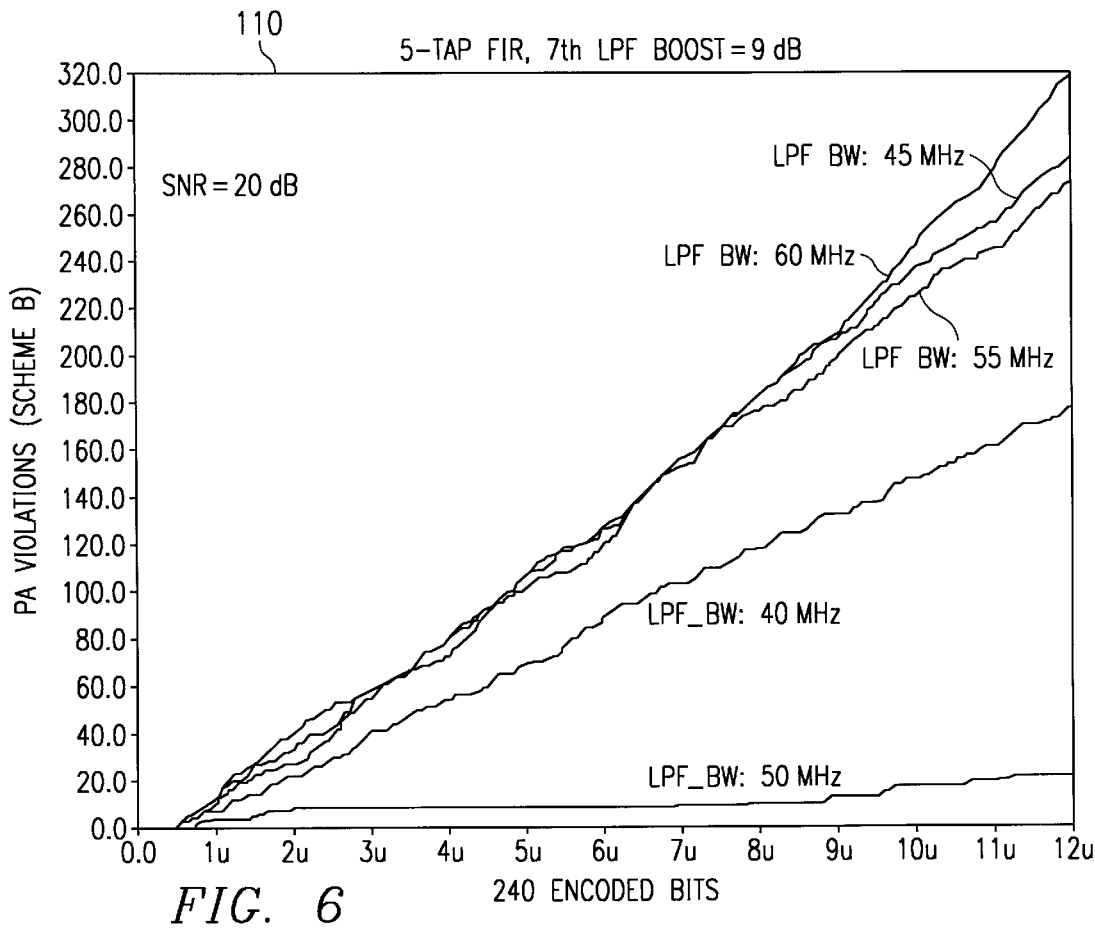
FIG. 6 is a graph illustrating the results of a simulation that shows polarity alternation violations as a function of the number of symbol detections for various circuitry settings of a low pass filter of the read channel.

FIG. 6 is a graph 110 illustrating the results of a simulation that shows polarity alternation violations as a function of the number of signal detections for various circuitry settings of low pass filter 26 of read channel 16. In this simulation, low pass filter 26 is implemented as a seventh order low pass filter with a boost of 9 dB. Also, discrete-time signal equalizer 32 is implemented as an analog FIR with five taps or multipliers and with read channel 16 operating at an SNR level of 20 dB. Graph 110 illustrates the effects of changing the bandwidth or cut-off frequency of low pass filter 26 and its effect on the number of polarity alternation violation detections. As is illustrated, the optimal setting of all of the various settings shown in FIG. 6 is 50 MHZ, where the polarity alternation violations are significantly less then those provided at other frequency settings.

Graph 110 illustrates one example of how the present invention may be used to optimize the circuitry settings and operation of read channel 16. A myriad of other circuitry parameters may be adjusted to optimize the performance of read channel 16 and to minimize the number of polarity alternation violations. These adjustments may be performed after manufacturing, during "burn-in", or during later times to optimize the operation of read channel 16. The operation and circuitry of read channel 16 may change for a variety of reasons such as increased noise, nonstationary data pattern-dependent transition noise variations, and mechanical imperfections caused by drive wear. Thus, as the operation of read channel 16 changes, the optimal circuitry parameter settings may change and thus may need to be adjusted. As was mentioned previously; the accumulation of polarity alternation violations may also signify an impending system failure, such as a head crash of a hard disk drive. When such conditions are present, steps may be taken to adjust circuitry parameters or eliminate noise sources to potentially prevent a catastrophic failure.

Figure 7:
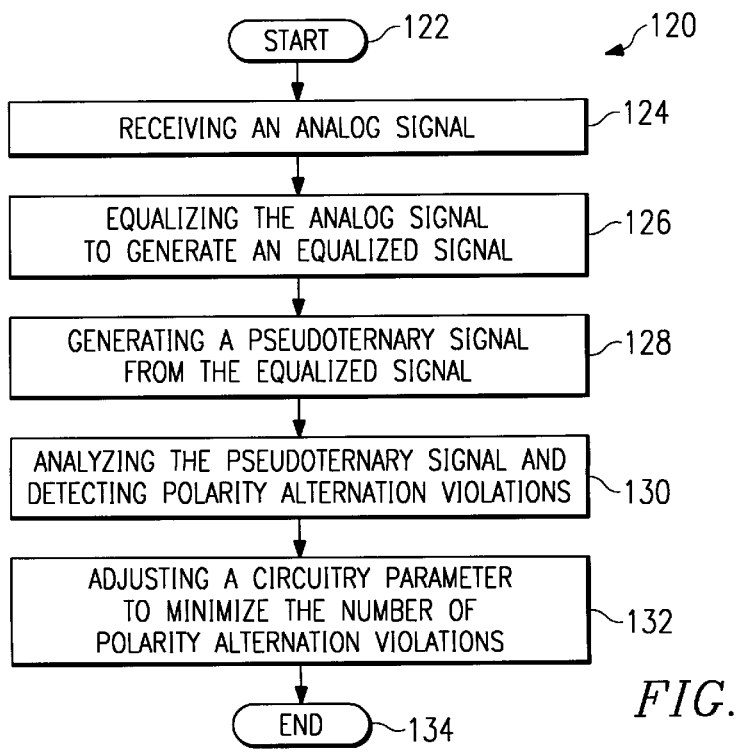
FIG. 7 is a flowchart illustrating an exemplary method for monitoring the performance of a digital channel and minimizing data errors.

FIG. 7 is a flow chart of a method 120 for monitoring the performance of a digital channel, such as read channel 16, and for minimizing data errors. The method starts at step 122 and proceeds to step 124 where an analog signal is received. The analog signal may be a data signal corresponding to stored data or information. The method proceeds next to step 126 where the analog signal is equalized to generate an equalized signal to a predetermined target. For example, the analog signal may be filtered, sampled, and constrained using partial response coding or correlative coding.

The method proceeds next to step 128 where a pseudoternary signal is generated from the equalized signal. The pseudoternary signal is then analyzed and polarity alternation violations are detected, as mentioned in step 130. The method then proceeds to step 132 where corresponding circuitry parameters may be adjusted to minimize the number of polarity alternation violations. For example, and as was illustrated in FIG. 6, the bandwidth or cut-off frequency of a low pass filter may be adjusted until the number of polarity alternation violations are minimized or optimized. A myriad of other circuitry parameters may also be adjusted such as the filter coefficients of an analog FIR, the boost of a low pass filter, to name a few. The method concludes at step 134.

Thus, it is apparent that there has been provided, in accordance with the present invention, a method and circuitry for monitoring a digital channel that satisfy the advantages set forth above. Although the preferred embodiment has been described in detail, it should be understood that various changes, substitutions, and alterations can be made herein without departing from the scope of the present invention. For example, although the present invention has been described and illustrated using a PR4 read channel, it should be understood that the present invention is not limited to only monitoring these types of channels. On the contrary, the present invention may be used to monitor any digital channel that provides a transfer function of the type: $1-D^n$, where n=1,2,3,4 ... and corresponds to the number of subsequences that must follow the polarity alternation rule. These channels may be referred to as dicode-type communication channels. Other channels that provide a 1-D subsequence may also use the present invention. In such channels, polarity alternation violations indicate an invalid state and hence are indicative of a data error. Similarly, the present invention may also be applied to class IV, extended, partial response (EPR4) channels which are implemented using an indirect EPR4 architecture in which a PR4 channel is combined with the transfer function 1+D. Also, the circuitry described and illustrated in the preferred embodiment as discrete or separate circuits may be combined into one circuit or split into separate circuits without departing from the scope of the present invention. For example, SBS detector 36 and violation detector and accumulator 40 of read channel 16 may be implemented together, independently, or separately from read channel 16. Furthermore, the direct connections illustrated herein could be altered by one skilled in the art such that two devices are merely coupled to one another through an intermediate device or devices, without being directly connected, while still achieving the desired results demonstrated by the present invention. For example, as mentioned above, an analog-to-digital converter may be provided between low pass filter 26 and discrete-time signal equalizer 32 to digitize the discrete analog signal. Other examples of changes, substitutions, and alterations are readily ascertainable by one skilled in the art and could be made without departing from the spirit and scope of the present invention as defined by the following claims.

What is claimed is:

1. A method for monitoring a digital channel comprising the steps of:

receiving an analog input signal corresponding to a digital signal;

equalizing the analog input signal to generate an equalized signal equalized to a predetermined partial response target;

generating a pseudoternary signal from the equalized signal; and analyzing the pseudoternary signal and detecting polarity alternation violations, wherein analyzing the pseudoternary signal includes counting the number of polarity alternation violations.

2. The method of claim 1, wherein the analyzing the pseudoternary signal step further includes detecting global constraint violations.

3. The method of claim 2, wherein the analyzing the pseudoternary signal step includes counting the number of polarity alternation violations and global constraint violations.

4. The method of claim 2, wherein the global constraint violations are imposed using run-length limited block encoding.

5. The method of claim 1, wherein a polarity alternation violation is found by analyzing each of a plurality of interleaved sub-sequences of the pseudoternary signal and detecting a polarity alternation violation each time the polarity fails to alternate between every other non-zero sample of a sub-sequence.

6. The method of claim 1, wherein a polarity alternation violation is found by analyzing each of a plurality of interleaved sub-sequences of the pseudoternary signal and detecting a polarity alternation violation each time the polarity fails to alternate between every other non-zero sample of a sub-sequence and resetting the analyzed samples to zero each time a polarity alternation violation is detected.

7. The method of claim 1, wherein a polarity alternation violation is found by analyzing the pseudoternary signal to ensure conformance with a $1-D^n$ constraint of partial response coding.

8. The method of claim 1, wherein the equalizing the analog input signal step includes the following steps:
   filtering the analog input signal using a continuous-time filter to remove high frequency noise to generate a filtered analog signal;
   sampling the filtered analog signal to generate a sampled analog signal; and
   filtering the sampled analog signal to generate the equalized signal and to provide a $1-D^2$ partial response channel equalization.

9. The method of claim 1, further comprising the steps of:
   storing information corresponding to the number of polarity alternation violations detected.

10. The method of claim 1, wherein the pseudoternary signal is a digital signal.

11. The method of claim 1, wherein the digital channel being monitored is a read channel of a hard disk drive.

12. The method of claim 1, wherein the generating a pseudoternary signal from the equalized signal step includes using a symbol-by-symbol detector.

13. The method of claim 12, wherein the symbol-by-symbol detector includes an ambiguity-zone compensation algorithm.

14. A method for monitoring a digital channel and minimizing data errors comprising the steps of:
   receiving an analog signal corresponding to a digital signal;
   equalizing the analog signal to generate an equalized signal;
   generating a pseudoternary signal from the equalized signal;
   analyzing the pseudoternary signal and detecting polarity alternation violations; and
   adjusting a circuitry parameter to minimize the number of polarity alternation violations.

15. The method of claim 14, wherein the circuitry parameter is the boost of a low pass filter used in the equalizing the analog signal step.

16. The method of claim 14, wherein the circuitry parameter is the cut-off frequency of a low pass filter used in the equalizing the analog signal step.

17. The method of claim 14, wherein the circuitry parameter is a coefficient of an analog finite impulse response filter.

18. A read channel for processing and monitoring an analog signal, the read channel comprising:
   a continuous-time filter operable to filter the analog signal to generate a filtered analog signal;
   a sampler operable to sample the filtered analog signal to generate a discrete analog signal;
   a discrete-time signal equalizer operable to filter the discrete analog signal to generate an equalized signal;
   a symbol-by-symbol detector operable to analyze the equalized signal to generate a pseudoternary signal;
   a violation detector operable to detect polarity alternations present in the pseudoternary signal; and
   a sequence detector operable to analyze the equalized signal to generate a corresponding digital data signal.

19. The read channel of claim 18, wherein the sampler is an analog-to-digital converter operable to convert the filtered analog signal to a corresponding filtered digital signal, and the discrete-time signal equalizer is a digital finite impulse response filter operable to filter the filtered digital signal to generate the equalized signal.

20. A read channel for processing and monitoring an analog signal, the read channel comprising:
   a continuous-time filter operable to filter the analog signal to generate a filtered analog signal;
   a sampler operable to sample the filtered analog signal to generate a discrete analog signal;
   a discrete-time signal equalizer operable to filter the discrete analog signal to generate an equalized signal;
   a symbol-by-symbol detector operable to analyze the equalized signal to generate a pseudoternary signal;
   a violation detector operable to detect and count polarity alternations present in the pseudoternary signal; and
   a sequence detector operable to analyze the equalized signal to generate a corresponding digital data signal.

21. The read channel of claim 20, wherein the sampler is an analog-to-digital converter operable to convert the filtered analog signal to a corresponding filtered digital signal, and the discrete-time signal equalizer is a digital finite impulse response filter operable to filter the filtered digital signal to generate the equalized signal.

22. The read channel of claim 20, wherein the violation detector includes a counter for counting the number of polarity alternation violations.

23. The read channel of claim 20, wherein the violation detector includes a detector for detecting global constraint violations.

24. The read channel of claim 20, wherein the violation detector detects a polarity alternation violation by analyzing each of a plurality of interleaved sub-sequences of the pseudoternary signal and detecting a polarity alternation violation each time the polarity fails to alternate between every other non-zero sample of a sub-sequence.

25. The read channel of claim 20, wherein the violation detector detects alternation violations by analyzing each of a plurality of interleaved sub-sequences of the pseudoternary signal and detecting a polarity alternation violation each time the polarity fails to alternate between every other non-zero sample of a sub-sequence and resetting the analyzed samples to zero each time a polarity alternation violation is detected.

26. The read channel of claim 20, wherein the symbol-by-symbol detector includes an ambiguity-zone compensation algorithm.

* * * * *

UNITED STATES PATENT AND TRADEMARK OFFICE
CERTIFICATE OF CORRECTION

PATENT NO. : 5,862,157
DATED : Jan. 19, 1999
INVENTOR(S) : Anthony G. Bessios

It is certified that error appears in the above-identified patent and that said Letters Patent is hereby corrected as shown below:

On the title page, Item [22]Filed:

The filing date on the patent is incorrect. It reads Feb. 2, 1997.

The correct date is -- Feb. 24, 1997 --.

Signed and Sealed this

Twentieth Day of July, 1999

Attest:

Q. TODD DICKINSON

Attesting Officer

Acting Commissioner of Patents and Trademarks